(12) United States Patent
Gokan et al.

(10) Patent No.: US 8,424,662 B2
(45) Date of Patent: Apr. 23, 2013

(54) MULTI-PLATE CLUTCH SYSTEM

(75) Inventors: Yoshitsugu Gokan, Wako (JP); Jun Miyazaki, Wako (JP); Yoshinobu Shiomi, Wako (JP); Michitaka Ogata, Kumamoto (JP)

(73) Assignees: Honda Motor Co., Ltd., Tokyo (JP); Kyushu Musashi Seimitsu Kabushiki Kaisha, Kumamoto (JP)

( * ) Notice: Subject to any disclaimer, the term of this patent is extended or adjusted under 35 U.S.C. 154(b) by 359 days.

(21) Appl. No.: 12/889,205

(22) Filed: Sep. 23, 2010

(65) Prior Publication Data
US 2011/0073429 A1 Mar. 31, 2011

(30) Foreign Application Priority Data
Sep. 30, 2009 (JP) ................. 2009-227707

(51) Int. Cl.
*F16D 13/54* (2006.01)
*F16D 13/74* (2006.01)
*F16D 43/21* (2006.01)

(52) U.S. Cl.
USPC ..... 192/70.23; 192/54.5; 192/56.6; 192/93 A; 192/113.5

(58) Field of Classification Search ............. 192/54.5, 192/56.6, 70.23, 113.5
See application file for complete search history.

(56) References Cited

U.S. PATENT DOCUMENTS

| | | | |
|---|---|---|---|
| 2008/0029332 A1 | 2/2008 | Gokan et al. | |
| 2009/0078526 A1* | 3/2009 | Kawatsu et al. | 192/70.23 |
| 2009/0321212 A1* | 12/2009 | Gokan et al. | 192/70.23 |
| 2010/0078286 A1* | 4/2010 | Gokan et al. | 192/70.23 |
| 2011/0024256 A1* | 2/2011 | Gokan et al. | 192/89.2 |
| 2011/0073432 A1* | 3/2011 | Gokan et al. | 192/70.12 |

FOREIGN PATENT DOCUMENTS

| | | |
|---|---|---|
| JP | 2008-38954 A | 2/2008 |
| JP | 2008-39082 A | 2/2008 |
| JP | 2008-57661 A | 3/2008 |
| JP | 2009-127770 A | 6/2009 |
| JP | 2009-197879 A | 9/2009 |

* cited by examiner

*Primary Examiner* — Richard M. Lorence
(74) *Attorney, Agent, or Firm* — Birch, Stewart, Kolasch & Birch, LLP

(57) ABSTRACT

A multi-plate clutch system includes: a pressure plate which is biased by a clutch spring in a direction in which driving friction plates and driven friction plates are brought into pressure contact with each other; and at least one of assist device configured to increase a pressure contact force when torque is changed for acceleration and the slipper device configured to decrease the pressure contact force when the torque is changed for deceleration. A ring member whose inner peripheral surface is put in sliding contact with an outer peripheral surface of one cam plate out of paired cam plates, which are included in at least one of the assist device and the slipper device, is fixed to a clutch inner, and oil discharging passages for guiding oil to a sliding contact portion between the one cam plate and the ring member are provided in outer peripheral edge portions of concave cams formed in the one cam plate. Accordingly, it is possible to supply a sufficient amount of oil to a sliding contact portion between the clutch inner and the outer periphery of the cam plate in a state where the clutch inner is centered together with the cam plate by being supported in sliding contact with the outer periphery of the cam plate.

20 Claims, 7 Drawing Sheets

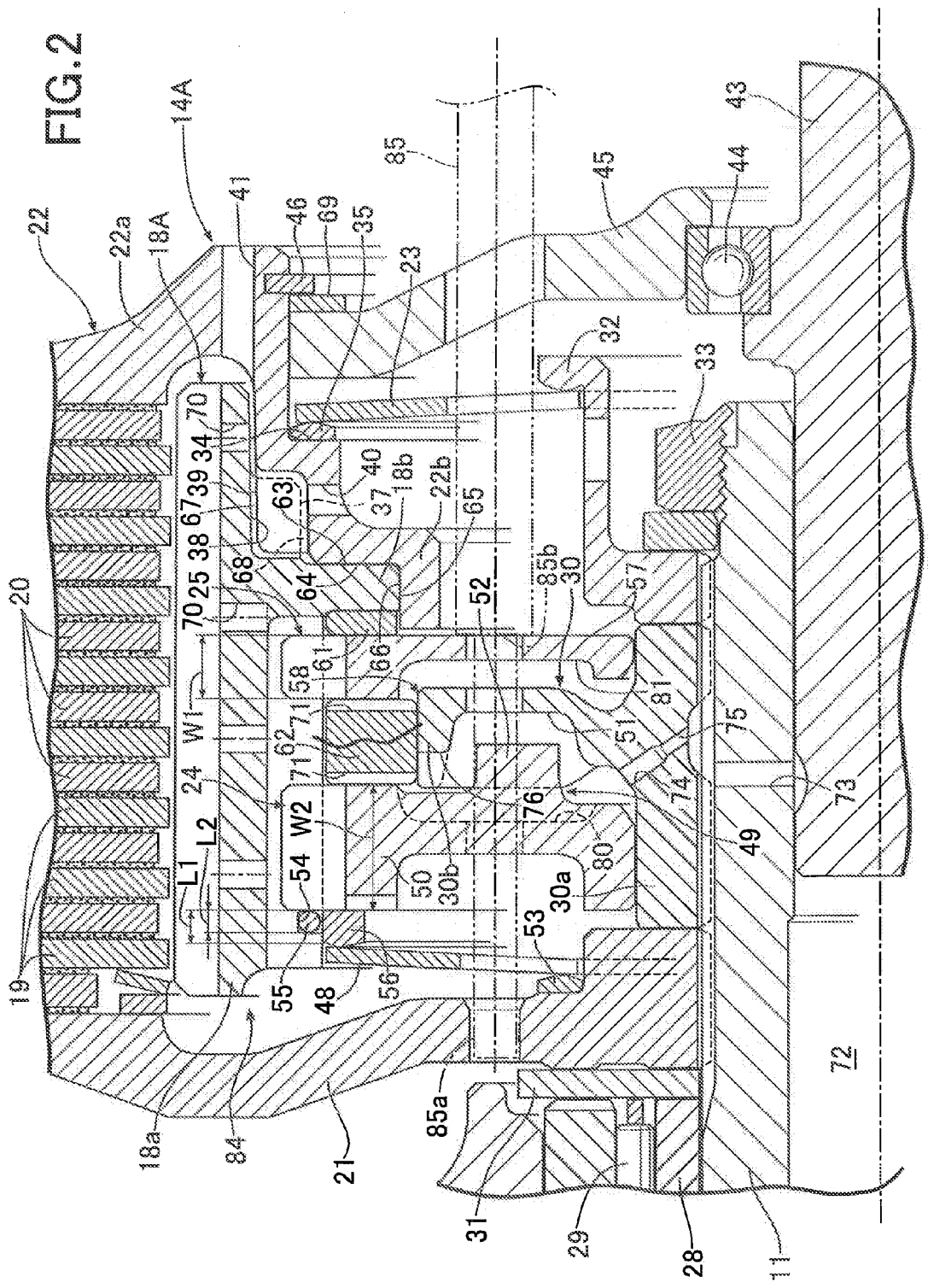

MULTI-PLATE CLUTCH SYSTEM

BACKGROUND OF THE INVENTION

1. Field of the Invention

The present invention relates to a multi-plate clutch system comprising: a clutch outer connected to an input member; a clutch inner connected to an output member; a plurality of driving friction plates engaged with the clutch outer movably in an axial direction, and unrotatably relative to the clutch outer; a plurality of driven friction plates alternately overlapped with the driving friction plates, and engaged with the clutch inner movably in the axial direction, and unrotatably relative to the clutch inner; a pressure plate movable in the axial direction to bring the driving friction plates and the driven friction plates into pressure contact with each other, thereby frictionally engaging the driving friction plates and the driven friction plates together; a clutch spring for biasing the pressure plate in a direction in which the driving friction plates and the driven friction plates are brought into pressure contact with each other; and at least one of assist means and slipper means, the assist means configured to increase a pressure contact force produced by the pressure plate when torque is changed for acceleration, the slipper means configured to decrease the pressure contact force produced by the pressure plate when the torque is changed for deceleration.

2. Description of the Related Art

Through Japanese Patent Application Laid-open No. 2008-38954, a multi-plate clutch system including assist means and slipper means is known in which: a boss part of a center cam plate fixed to an output shaft and being common to the assist means and the slipper means is slidingly fitted to an assist cam plate and a slipper cam plate which are fixed to a clutch inner with bolts to be unmovable relative to the clutch inner in an axial direction; thereby, the rotational center of the clutch inner is aligned with the respective rotational centers of the output shaft and the center cam plate; and the boss part of the center cam plate includes oil holes for supplying oil to the sliding portion between the assist cam plate and the boss part, as well as between the slipper cam plate and the boss part.

Meanwhile, there is an idea that, for the purpose of securing the centering for aligning the rotational center of the clutch inner with the rotational centers of the output shaft and the center cam plate, the inner peripheral surface of the clutch inner is put in sliding contact with and is supported by the outer peripheral surface of the center cam plate. To this end, the slidability needs to be secured by sufficiently supplying oil to the sliding contact portion between the clutch inner and the center cam plate. However, if the technique disclosed in Japanese Patent Application Laid-open No. 2008-38954 is simply applied to this, a problem occurs in which: oil supplied from the oil holes is retained in the concave cams in the center cam plate; and a sufficient amount of oil cannot be supplied to the sliding contact portion.

SUMMARY OF THE INVENTION

The present invention has been made in view of such a situation. An object of the present invention is to provide a multi-plate clutch system which is capable of supplying a sufficient amount of oil to a sliding contact portion between a clutch inner and an outer periphery of a cam plate in a state where the clutch inner is centered together with the cam plate by being supported in sliding contact with the outer periphery of the cam plate.

In order to achieve the object, according to a first feature of the present invention, there is provided a multi-plate clutch system comprising: a clutch outer connected to an input member; a clutch inner connected to an output member; a plurality of driving friction plates engaged with the clutch outer movably in an axial direction, and unrotatably relative to the clutch outer; a plurality of driven friction plates alternately overlapped with the driving friction plates, and engaged with the clutch inner movably in the axial direction, and unrotatably relative to the clutch inner; a pressure plate movable in the axial direction to bring the driving friction plates and the driven friction plates into pressure contact with each other, thereby frictionally engaging the driving friction plates and the driven friction plates together; a clutch spring for biasing the pressure plate in a direction in which the driving friction plates and the driven friction plates are brought into pressure contact with each other; and at least one of assist means and slipper means, the assist means configured to increase a pressure contact force produced by the pressure plate when torque is changed for acceleration, the slipper means configured to decrease the pressure contact force produced by the pressure plate when the torque is changed for deceleration, wherein said at least one of the assist means and the slipper means includes paired cam plates which are opposed to each other in the axial direction, a ring member whose inner peripheral surface is put in sliding contact with an outer peripheral surface of a first cam plate out of the paired cam plates is fixed to the clutch inner, and an oil discharging passage for guiding oil to a sliding contact portion between the first cam plate and the ring member is provided in an outer peripheral edge portion of a concave cam formed in the first cam plate.

According to the first feature of the present invention, the inner peripheral surface of the ring member fixed to the clutch inner is supported in sliding contact with the outer peripheral surface of the first one of the paired cam plates opposed to each other in the axial direction. Thereby, the first cam plate and the clutch inner are centered. In such a centering structure, oil accumulated in the concave cam formed in the first cam plate can be sufficiently supplied to the sliding contact portion between the first cam plate and the ring member in such a way that the oil is guided from the oil discharging passage, which is formed in the outer peripheral edge portion of the concave cam, to the sliding contact portion between the first cam plate and the ring member. Accordingly, the enhancement of the lubricity can be achieved.

In order to achieve the object, according to a second feature of the present invention, there is provided a multi-plate clutch system comprising: a clutch outer connected to an input member; a clutch inner connected to an output member; a plurality of driving friction plates engaged with the clutch outer movably in an axial direction, and unrotatably relative to the clutch outer; a plurality of driven friction plates alternately overlapped with the driving friction plates, and engaged with the clutch inner movably in the axial direction, and unrotatably relative to the clutch inner; a pressure plate movable in the axial direction in order to bring the driving friction plates and the driven friction plates into pressure contact with each other, thereby frictionally engaging the driving friction plates and the driven friction plates together; a clutch spring for biasing the pressure plate in a direction in which the driving friction plates and the driven friction plates are brought into pressure contact with each other; and at least one of assist means and slipper means, the assist means configured to increase a pressure contact force produced by the pressure plate when torque is changed for acceleration, the slipper means configured to decrease the pressure contact force produced by the pressure plate when the torque is changed for deceleration, wherein said at least one of the assist means and the slipper means includes paired cam plates which are opposed to each other in the axial direction, an inner peripheral surface of the clutch inner is supported in sliding contact with an outer peripheral surface of a first cam plate out of the paired cam plates, and an oil discharging passage for guiding oil to a sliding contact portion between the first cam plate and the clutch inner is provided in an outer peripheral edge portion of a concave cam formed in the first cam plate.

According to the second feature of the present invention, the inner peripheral surface of the clutch inner is supported in sliding contact with the outer peripheral surface of the first one of the paired cam plates opposed to each other in the axial direction. Thereby, the first cam plate and the clutch inner are centered. In such a centering structure, oil accumulated in the concave cam formed in the first cam plate can be sufficiently supplied to the sliding contact portion between the first cam plate and the clutch inner in such a way that the oil is guided from the oil discharging passage, which is formed in the outer peripheral edge portion of the concave cam, to the sliding contact portion between the first cam plate and the clutch inner. Accordingly, the enhancement of the lubricity can be achieved.

According to a third feature of the present invention, in addition to the first or second feature, the oil discharging passage is formed by notching the outer peripheral edge portion of the concave cam.

According to the third feature of the present invention, the oil discharging passage is formed by notching the outer peripheral edge portion of the concave cam. For this reason, the oil discharging passage can be formed with the simple structure, and the lubricity in the sliding contact portion can be enhanced by use of the simple structure.

According to a fourth feature of the present invention, in addition to the first or second feature, the oil discharging passage is formed as a through-hole which passes through the outer peripheral edge portion of the concave cam from an inner surface thereof to an outer surface thereof.

According to the fourth feature of the present invention, the oil discharging passage is formed by providing the through-hole through which the inner surface and outer surface of the outer peripheral edge portion of the concave cam communicate with each other. For this reason, the oil in the concave cam can be securely supplied to the sliding contact portion, regardless of the height of the peripheral edge portion of the concave cam.

According to a fifth feature of the present invention, in addition to the third feature, at least a portion of the first cam plate in which the concave cam is arranged is formed by forging.

According to the fifth feature of the present invention, at least the portion in which the concave cam is provided is forged. For this reason, by making the depth of the depression shallower by providing the notch in the outer peripheral edge portion of the concave cam, it is possible to suppress the amount of deformation of the parts during forming of the parts, and accordingly to enhance the precision by suppressing the occurrence of parts defectively formed.

According to a sixth feature of the present invention, in addition to any of the first to fifth features, a contact surface of the concave cam and a contact surface of a convex cam, which are provided in the paired cam plates to come into contact with each other, are formed to come into contact with each other when the paired cam plates rotate relative to each other, and the oil discharging passage is provided in the outer peripheral edge portion of only the first cam plate.

According to the sixth feature of the present invention, the contact surface of the concave cam provided in one of the paired cam plates and the contact surface of the convex cam provided in the other of the paired cam plates are brought into contact with each other, when the paired cam plates rotate relative to each other. The oil discharging passage is provided in the outer peripheral edge portion of the first cam plate alone. For these reasons, by providing no oil discharging passage in the contact surfaces of the concave cam and the convex cam, it is possible to avoid decrease in the cam contact strength, and to secure the lubricity in the sliding contact portion.

According to a seventh feature of the present invention, in addition to any of the first to sixth features, the concave cam and a convex cam are provided in the paired cam plates to come into contact with each other, and concave parts, which are respectively arranged at opposite sides of the convex cam, are formed in one cam plate, which is provided with the convex cam, out of the paired cam plates.

According to the seventh feature of the present invention, the concave parts, which are arranged at the opposite sides of the convex cam, are formed in the cam plate which is provided with the convex cam out of the paired cam plates. For this reason, oil supplied to the convex cam can be caught by and retained in the concave parts at the opposite sides of the convex cam, and the lubricity between the concave cam and the convex cam accordingly can be enhanced by securing oil to be distributed to the convex cam.

According to an eighth feature of the present invention, in addition to the seventh feature, outer peripheral edge portions of the respective concave parts are formed curving toward a sliding contact portion in an outer periphery of the first cam plate.

According to the eighth feature of the present invention, the outer peripheral edge portions of the respective concave parts are curved toward the sliding contact portion in the outer periphery of the first cam plate. For this reason, the lubricity can be enhanced by actively supplying the oil accumulated in the concave parts toward the sliding contact portion.

According to a ninth feature of the present invention, in addition to any of the first to eighth features, the first cam plate of the paired cam plates opposed to each other integrally includes: a boss part supported by the output member; and a disc part provided with the concave cam corresponding to a convex cam provided in a second cam plate of the paired cam plates, and jutting from the boss part outward in a radial direction, and an oil supplying passage for supplying oil toward the convex cam in the second cam plate is provided in the boss part in such a way as to be directed to a direction oblique to center axes of the two respective cam plates.

According to the ninth feature of the present invention, the oil supplying passage for supplying oil to the convex cam provided in a second one of the paired cam plates are provided in the boss part included in the first cam plate in such a way as to be directed obliquely to the center axes of the respective paired cam plates. For this reason, by ejecting oil to the interstice between the concave cam and the convex cam which need the lubricity in particular, it is possible to prevent the occurrence of insufficient lubricity which would otherwise occur due to oil shortage.

According to a tenth feature of the present invention, in addition to the ninth feature, an orifice is provided in the oil supplying passage.

Furthermore, according to the tenth feature of the present invention, the orifice is provided in the oil supplying passage. For this reason, it is possible to enhance the overall lubricity between the convex cam and the concave cam by: ejecting the oil toward the convex cam with a high pressure; and converting the oil to mist and dispersing the mist.

Here, a main shaft 11 of embodiments corresponds to the output member of the present invention; a primary driven gear 16 of the embodiments corresponds to the input member of the present invention; a center cam plate 30, an assist cam plate 50 and a slipper cam plate 57 of the embodiments correspond to the cam plate of the present invention; and a guide ring 62 of the embodiments corresponds to the ring member of the present invention.

The above description, other objects, characteristics and advantages of the present invention will be clear from detailed descriptions which will be provided for the preferred embodiments referring to the attached drawings.

BRIEF DESCRIPTION OF THE DRAWINGS

FIG. 2 is an enlarged view of a part of the multi-plate clutch system, which is indicated by an arrow numbered 2 in FIG. 1.

DESCRIPTION OF THE PREFERRED EMBODIMENTS

Figure 1:
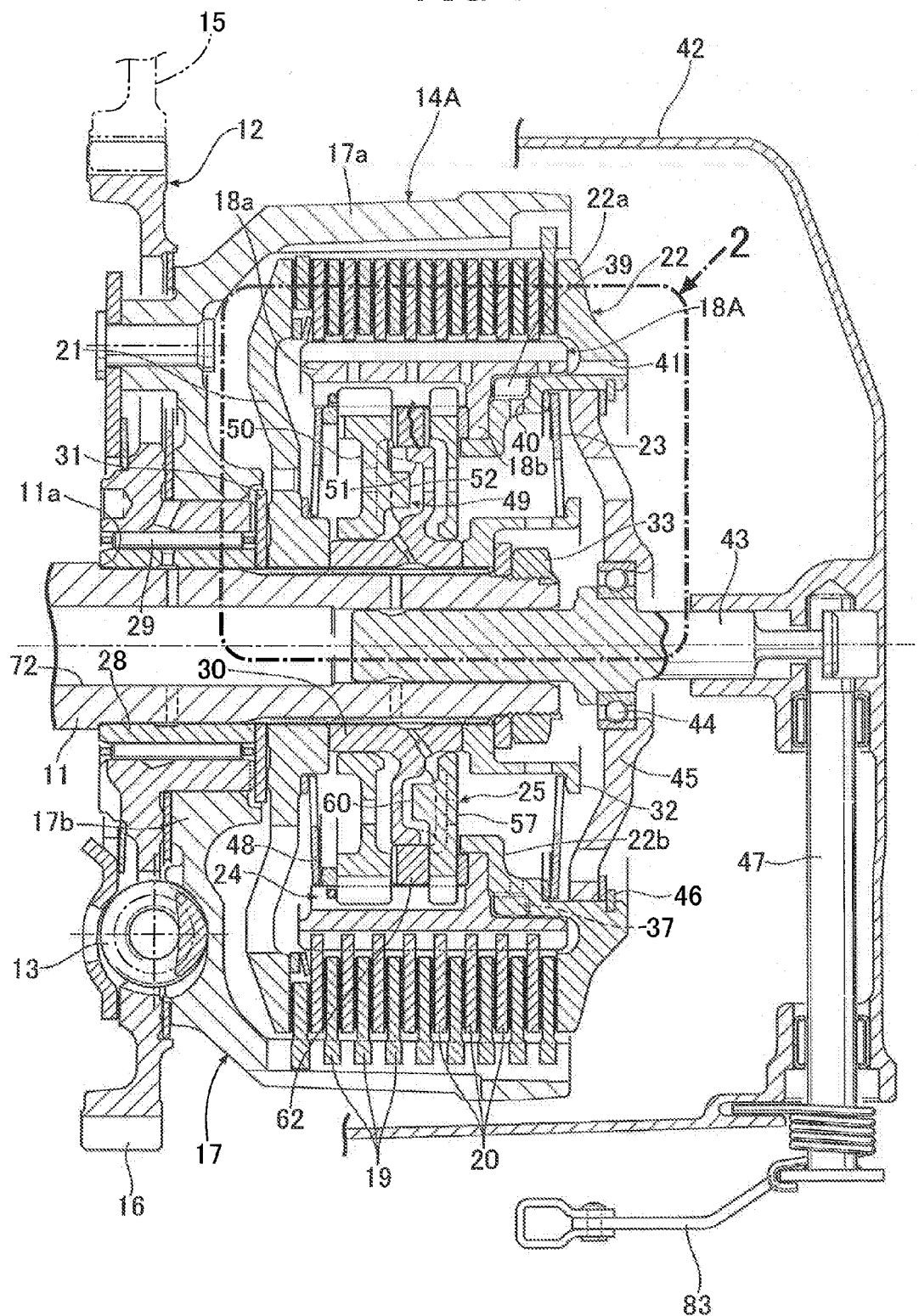
FIG. 1 is a longitudinal cross-sectional view of a multi-plate clutch system according to Embodiment 1.

Referring to the attached drawings, descriptions will be hereinbelow provided for embodiments of the present invention.

[Embodiment 1]

Referring to FIGS. 1 to 5, descriptions will be provided for Embodiment 1 of the present invention. First of all, in FIG. 1, a primary speed reduction unit 12, a damper spring 13 and a multi-plate clutch system 14A are installed between a crankshaft (not illustrated) of an engine mounted, for example, on a motorcycle and a main shaft 11 of a gear transmission unit (not illustrated). The primary speed reduction unit 12 includes: a primary driving gear 15 provided to the crankshaft; and a primary driven gear 16 in mesh with the primary driving gear 15. The primary driven gear 16 is supported rotatably relative to the main shaft 11.

Referring to FIG. 2 together, the multi-plate clutch system 14A is of a wet type. The multi-plate clutch system 14A includes a clutch outer 17, a clutch inner 18A, multiple driving friction plates 19, multiple driven friction plates 20, a pressure receiving plate 21, a pressure plate 22, a clutch spring 23, assist means 24 and slipper means 25. The clutch outer 17 is connected to the primary driven gear 16 as an input member through the damper spring 13. The clutch inner 18A integrally includes: an engagement cylinder part 18a coaxially arranged in the clutch outer 17; and an annular support wall 18b jutting out inward in the radial direction from an inner surface of a middle portion of the engagement cylinder part 18a. The driving friction plates 19 are engaged with the clutch outer 17 unrotatably relative to the clutch outer 17. The driven friction plates 20 are alternately disposed with the driving friction plates 19, and are engaged with the outer periphery of the engagement cylinder part 18a of the clutch inner 18A unrotatably relative to the clutch inner 18A. The pressure receiving plate 21 is a compression plate fixed to the main shaft 11 as an output member in such a way as to be opposed to the driving friction plates 19 and the driven friction plates 20, which are overlapped with each other, from one end side thereof. The pressure plate 22 is configured to compress the driving friction plates 19 and the driven friction plates 20 which are overlapped with each other, between the pressure plate 22 and the pressure receiving plate 21. The clutch spring 23 is configured to bias the pressure plate 22 in a direction in which the driving friction plates 19 and the driven friction plates 20 are compressed between the pressure plate 22 and the pressure receiving plate 21. The assist means 24 is configured to increase the biasing force of the clutch spring 23 when torque is changed for acceleration in a state where power is being transmitted from the primary driven gear 16 to the main shaft 11. The slipper means 25 is configured to decrease the biasing force of the clutch spring 23 when the torque is changed for deceleration in a state where back torque is being transmitted from the main shaft 11 to the primary driven gear 16.

The clutch outer 17 integrally includes: a cylinder part 17a coaxially surrounding the engagement cylinder part 18a of the clutch inner 18A; and an end wall part 17b continuing to an end portion of the cylinder part 17a which is on the closer side to the primary driven gear 16. Thus, the clutch outer 17 is formed of a bowl-shape which is opened in a direction opposite to the primary driven gear 16. The outer peripheral portions of the respective multiple driving friction plates 19 are engaged with the inner periphery of the cylinder part 17a movably in the axial direction, and unrotatably relative to the cylinder part 17a.

An annular step part 11a facing toward the multi-plate clutch system 14A is formed at a portion of the outer periphery of the main shaft 11, which corresponds to the primary speed reduction unit 12. An end portion of a cylinder-shaped sleeve 28 fitted on the outer periphery of the main shaft 11, which is on the opposite side from the multi-plate clutch system 14A, abuts on the annular step part 11a. A needle bearing 29 is installed between the outer periphery of this sleeve 28 and the inner periphery of the primary driven gear 16.

A center cam plate 30 which is common between the assist means 24 and the slipper means 25 is arranged inwardly of the engagement cylinder part 18a of the clutch inner 18A in the radial direction, and closer to the pressure receiving plate 21 than is the annular support wall 18b of the clutch inner 18A. This center cam plate 30 integrally includes: a cylinder-shaped boss part 30a spline-engaged with the outer periphery of the main shaft 11; and a disc part 30b jutting out in the radial direction from an axial-direction middle portion of the boss part 30a, and placed in a plane orthogonal to the axial direction of the main shaft 11.

On the other hand, the pressure receiving plate 21 is formed of a disc-shape. The inner peripheral portion of this pressure receiving plate 21 is spline-engaged with the outer periphery of the main shaft 11 in such a way that the inner peripheral portion thereof is interposed between a ring plate-shape press plate 31 abutting on an end portion of the sleeve 28, which is on the closer side to the multi-plate clutch system 14A, and an end portion of the boss part 30a. In addition, a spring receiving member 32 configured to interpose the boss part 30a between the spring receiving member 32 and the inner periphery of the pressure receiving plate 21 is spline-engaged with the main shaft 11. A nut 33 configured to interpose the spring receiving member 32 between the nut 33 and the boss part 30a is screwed to the main shaft 11. By fastening this nut 33, the sleeve 28, the press plate 31, the inner peripheral portion of the pressure receiving plate 21, the boss part 30a of the center cam plate 30, and the spring receiving member 32 are held between the annular step part 11a and the nut 33. Thereby, the sleeve 28, the press plate 31, the pressure receiving plate 21, the center cam plate 30 and the spring receiving member 32 are fixed to the main shaft 11.

The pressure plate 22 integrally includes: an annular press part 22a configured to interpose the driving friction plates 19 and the driven friction plates 20 between the press part 22a and the pressure receiving plate 21; an insertion cylinder part 22b installed consecutively to the press part 22a in such a way as to be inserted in the engagement cylinder part 18a of the clutch inner 18A. The insertion cylinder part 22b is formed with steps in such a way as to become smaller in diameter toward its front end step by step.

The clutch spring 23 is a disc spring provided between the spring receiving member 32 fixed to the main shaft 11 and the pressure plate 22. The inner peripheral portion of this clutch spring 23 abuts on and engages with the spring receiving member 32 from the center cam plate 30 side. The outer peripheral portion of the clutch spring 23 abuts on an annular step part 34, which is provided in the insertion cylinder part 22b of the pressure plate 22 and faces in a direction opposite to the center cam plate 30, with a ring-shaped sliding contact plate 35 being interposed in between. Accordingly, the pressure plate 22 is biased by the clutch spring 23 in a direction in which the multi-plate clutch system 14A is brought into a connected condition by bringing the driving friction plates 19 and the driven friction plates 20 into pressure contact and resultant frictional engagement with each other.

Meanwhile, the clutch inner 18A is capable of moving relative to the main shaft 11 in the axial direction. This clutch inner 18A and the pressure plate 22, which is a member different from the clutch inner 18A, are connected together separably in the axial direction and unrotatably relative to each other in such a way that, when the pressure contact force of the pressure plate 22 is increased by the assist means 24, the pressure plate 22 is moved in the direction in which the driving friction plates 19 and the driven friction plates 20 are brought into pressure contact with each other, and concurrently the clutch inner 18A is moved relative to the pressure plate 22 in the same direction in order to be detached from the pressure plate 22.

Accordingly, the insertion cylinder part 22b of the pressure plate 22 is inserted in an end portion of the engagement cylinder part 18a included in the clutch inner 18A, which is on the closer side to the pressure plate 22. Multiple groove-forming projecting parts 37 are provided in one of the inner periphery of the engagement cylinder part 18a and the outer periphery of the insertion cylinder part 22b, in the case of this embodiment, in the inner periphery of the engagement cylinder part 18a. Multiple spline projecting parts 39 are provided in the other of the inner periphery of the engagement cylinder part 18a and the outer periphery of the insertion cylinder part 22b, in the case of this embodiment, in the outer periphery of the insertion cylinder part 22b. Spline grooves 38 with which to engage the spline projecting parts 39 are formed in the respective groove-forming projecting parts 37.

A first oil passage 40 for guiding oil to engagement portions between the spline grooves 38 and the spline projecting parts 39 is provided in the insertion cylinder part 22b of the pressure plate 22 in such a way as to penetrate the insertion cylinder part 22b in the radial direction. In addition, a second oil passage 41 for guiding oil to engagement portions between the spline grooves 38 and the spline projecting parts 39 is provided in the press part 22a of the pressure plate 22 in such a way as to penetrate the press part 22a in the axial direction.

Meanwhile, the multi-plate clutch system 14A is covered with an engine cover 42 provided to the engine. An end portion of an operation shaft 43 is fitted in the engine cover 42 movably in the axial direction. The other end portion of the operation shaft 43 is fitted in the main shaft 11 coaxially and slidably. The inner peripheral portion of a disc-shaped lifter 45 is held by a middle portion of this operation shaft 43 with a clutch bearing 44 being interposed in between. The outer periphery of this lifter 45 abuts on and is engaged with a stop ring 46 attached to the inner periphery of the press part 22a in the pressure plate 22 from the clutch spring 23 side with a ring-shaped sliding contact plate 69 being interposed in between.

A manipulation shaft 47 for switching the disconnection and connection of the multi-plate clutch system 14A is rotatably supported by the engine cover 42. A lever 83 is provided in an end portion of the manipulation shaft 47 which projects from the engine cover 42. In addition, an end portion of the operation shaft 43 is engaged with an inner end portion of the manipulation shaft 47 in such a way as to move in the axial direction depending on the rotation of the manipulation shaft 47. Accordingly, when the manipulation shaft 47 is manipulated to rotate in a direction which causes the operation shaft 43 to move in a direction in which the press part 22a of the pressure plate 22 comes away from the pressure receiving plate 21, the multi-plate clutch system 14A is put into a condition of disconnecting the power transmission.

The assist means 24 moves the pressure plate 22 closer to the pressure receiving plate 21 depending on the increase in the driving force inputted from the primary driven gear 16. The assist means 24 includes: a spring 48 configured to exert a spring force for biasing the clutch inner 18A against the spring force of the clutch spring 23; and a cam mechanism 49 configured to forcedly move the clutch inner 18A against the biasing force of the spring 48 on the occasion of increasing the pressure-contact force produced by the pressure plate 22 when torque is changed for acceleration.

The cam mechanism 49 is provided between the disc part 30b of the center cam plate 30 fixed to the main shaft 11 and an assist cam plate 50 whose inner peripheral portion is slidingly supported by the boss part 30a in the center cam plate 30 in such a way as to be opposed to a first surface of the disc part 30b. The outer periphery of the assist cam plate 50 is spline-engaged with the inner periphery of the engagement cylinder part 18a in the clutch inner 18A.

Figure 3A:
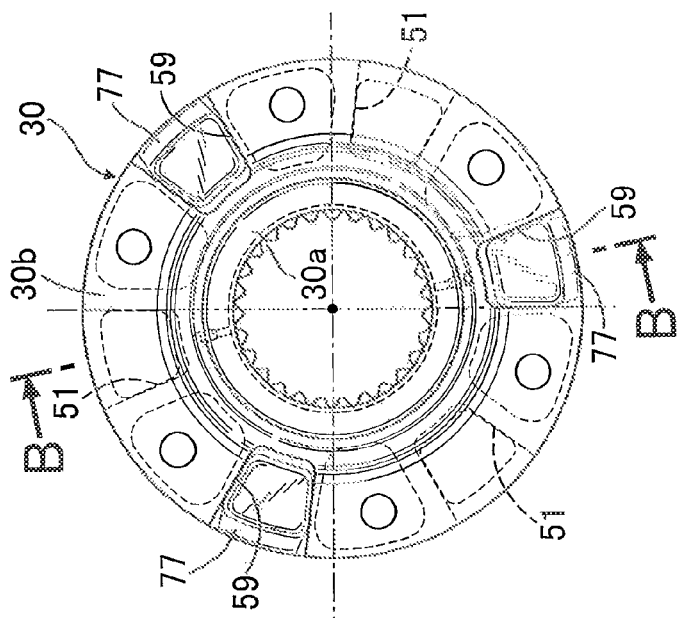
FIGS. 3A, 3B and 3C are a right side view, a longitudinal cross-sectional view, and a left side view of a center cam plate, respectively.
Figure 3B:
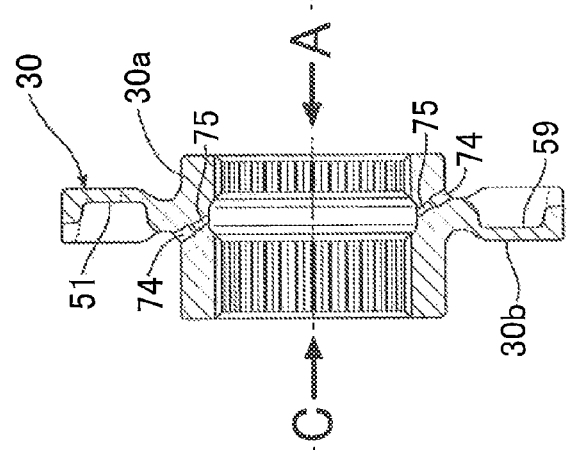
Figure 3C:
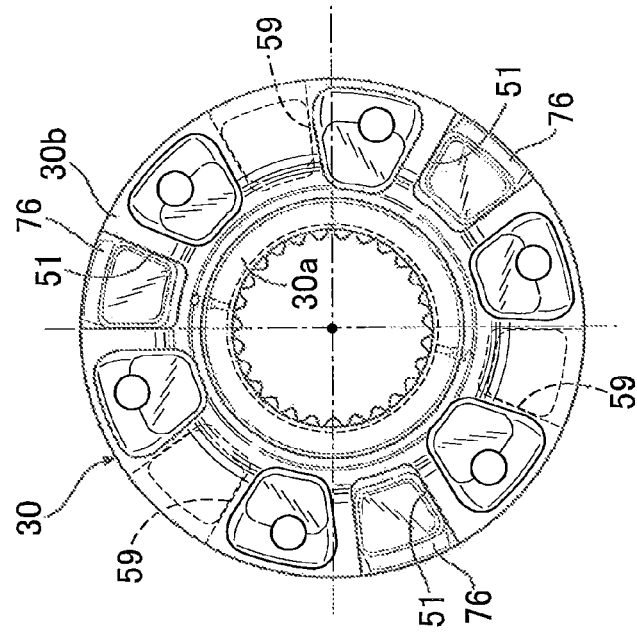
Figure 4A:
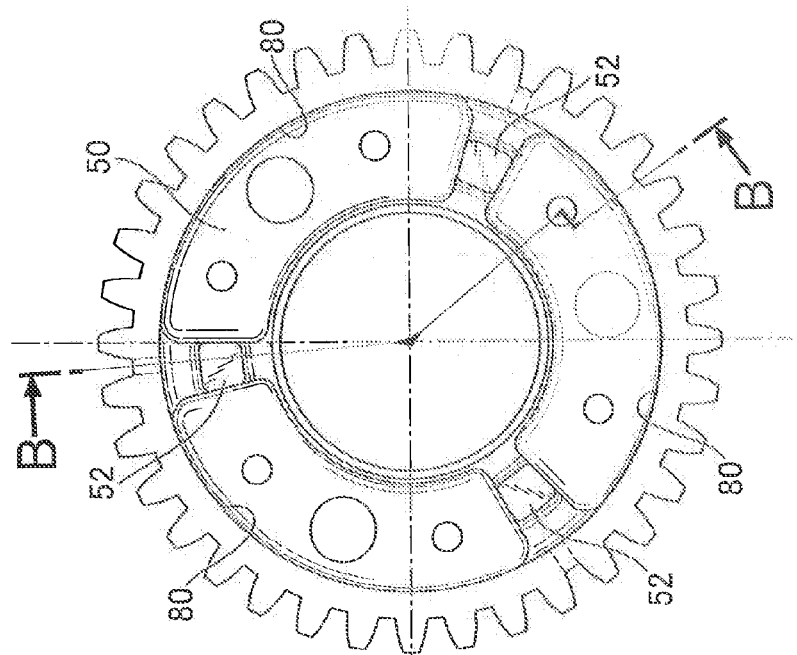
FIGS. 4A, 4B and 4C are a right side view, a longitudinal cross-sectional view, and a left side view of an assist cam plate, respectively.
Figure 4B:
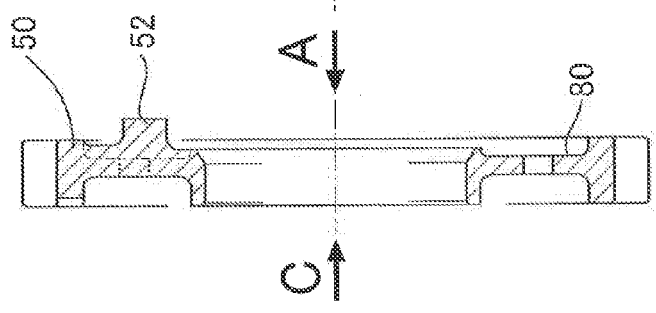
Figure 4C:
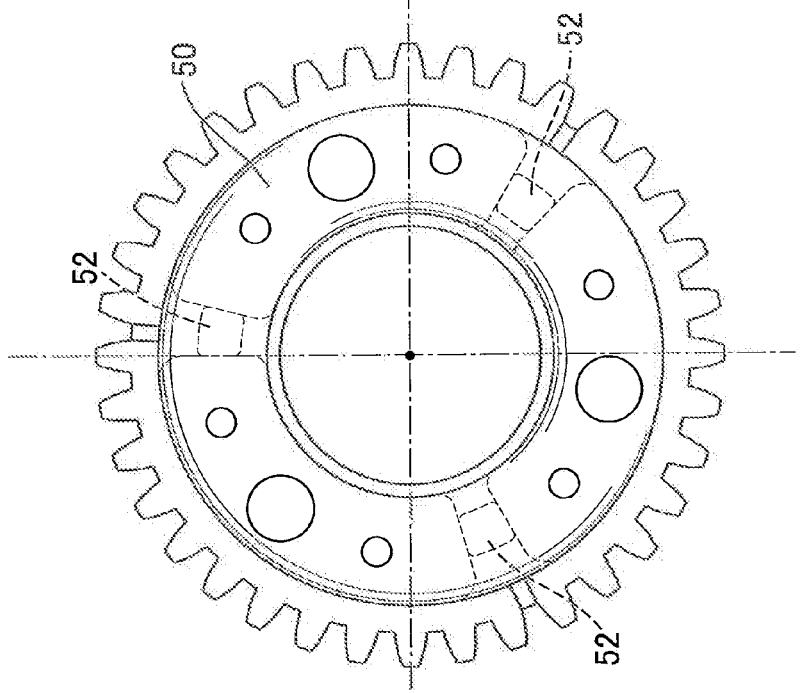

Referring to FIGS. 3A to 3C together, multiple first concave cams 51, for example, three first concave cams 51 are provided in the first surface of the disc part 30b of the center cam plate 30 at equal intervals in the circumferential direction. As shown in FIGS. 4A to 4C, multiple first convex cams 52, for example, three first convex cams 52 constituting the cam mechanism 49 in cooperation with the first concave cams 51 are projectingly provided in a surface of the assist cam plate 50, which is on the closer side to the disc part 30b.

A stop ring 55 attached to an annular depressed part 54 which is provided in the inner periphery of the engagement cylinder part 18a in the clutch inner 18A abuts on and engages with the outer periphery of an end surface of the assist cam plate 50, which is on the opposite side from the disc part 30b.

In addition, the spring 48 is a disc spring whose inner peripheral portion abuts on and is supported by the inner peripheral portion of the pressure receiving plate 21 with a ring-shaped sliding contact plate 53 being interposed in between. The outer periphery of this spring 48 is made to abut on an annular receiving member 56 abutting on an end surface of the assist cam plate 50, which is on the opposite side from the center cam plate 30. In addition, the receiving member 56 is arranged contiguous with the inner periphery of the stop ring 55. The outer diameter of the receiving member 56 is set equal to the inner diameter of the stop ring 55 as attached to the annular depressed part 54. The axial-direction length L1 of the receiving member 56 is set larger than the axial-direction opening width L2 of the annular depressed part 54.

The slipper means 25 moves the clutch inner 18A in a direction in which the pressure plate 22 is caused to come away from the pressure receiving plate 21 when the torque is changed for deceleration. The slipper means 25 includes a cam mechanism 58 which is provided between the center cam plate 30 and a slipper cam plate 57 whose inner peripheral portion is slidingly supported by the boss part 30a in the center cam plate 30 in such a way as to be opposed to a second surface of the disc part 30b in the center cam plate 30. The outer periphery of the slipper cam plate 57 is spline-engaged with the inner periphery of the engagement cylinder part 18a in the clutch inner 18A.

Figure 5A:
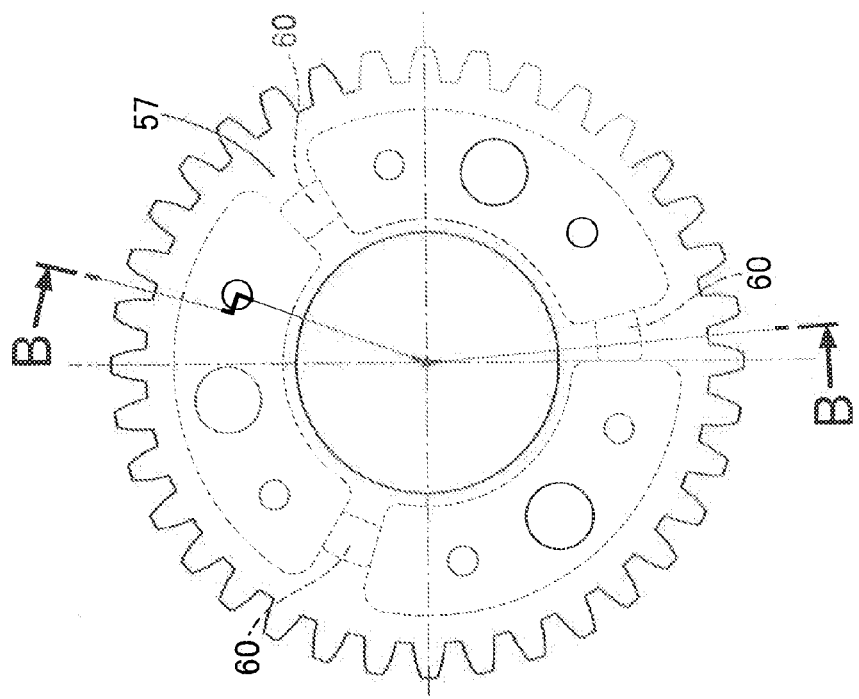
FIGS. 5A, 5B and 5C are a right side view, a longitudinal cross-sectional view, and a left side view of a slipper cam plate, respectively.
Figure 5B:
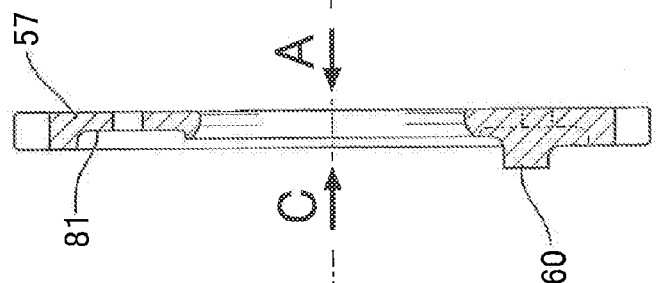
Figure 5C:
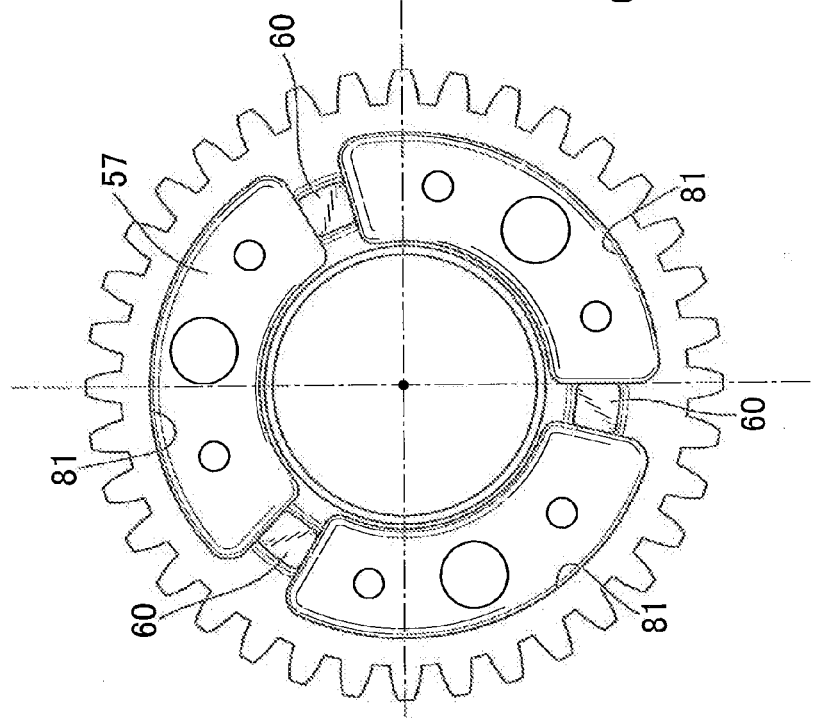

As shown in FIGS. 3A to 3C, multiple second concave cams 59, for example, three second concave cams 59 are provided in the second surface of the disc part 30b of the center cam plate 30 at equal intervals in the circumferential direction in such a way that one second concave cam 59 is situated in a middle portion between each neighboring two of the first concave cams 51. As shown in FIGS. 5A to 5C, multiple second convex cams 60, for example, three second convex cams 60 constituting the cam mechanism 58 in cooperation with the second concave cams 59 are projectingly provided in a surface of the slipper cam plate 57 which is on the closer side to the disc part 30b.

The outer periphery of an end surface of the slipper cam plate 57, which is on the opposite side from the disc part 30b, abuts on the annular support wall 18b of the clutch inner 18A with a ring-shaped sliding contact plate 61 being interposed in between. The assist cam plate 50 and the slipper cam plate 57, which are opposed to the disc part 30b of the center cam plate 30 from the respective two sides, are fixed to the clutch inner 18A in such a way as to be held between the annular support wall 18b provided in the clutch inner 18A and the stop ring 55 attached to the inner periphery of the engagement cylinder part 18a of the clutch inner 18A.

Furthermore, an annular guide ring 62 interposed between the assist cam plate 50 and the slipper cam plate 57 is arranged between the outer periphery of the disc part 30b in the center cam plate 30 and the inner periphery of the engagement cylinder part 18a of the clutch inner 18A.

In addition, the width W1 of the spline engagement of the slipper cam plate 57 with the clutch inner 18A is set smaller than the width W2 of the spline engagement of the assist cam plate 50 as the other cam plate with the clutch inner 18A. Here, the slipper cam plate 57 is arranged on the closer side to the annular support wall 18b provided in the clutch inner 18A out of the assist cam plate 50 and the slipper cam plate 57.

Moreover, flat abutment parts 63, 64 extending along the planes orthogonal to the axes of the clutch inner 18A and the pressure plate 22 are provided in contact with each other in the clutch inner 18A and the pressure plate 22, respectively. In this embodiment, the abutment part 63 which is one of the two abutment parts is formed in such a way as to extend inward in the radial direction while integrally continuing to the multiple groove-forming projecting parts 37 in the inner periphery of the engagement cylinder part 18a in the clutch inner 18A. The abutment part 64 which is the other of the two abutment parts is provided in a halfway portion of the insertion cylinder part 22b in such a way as to extend inward in the radial direction while integrally continuing to the spline projecting parts 39.

Accordingly, while in a normal power transmission condition, the abutment part 63 of the clutch inner 18A which is biased toward the pressure plate 22 by the spring 48 abuts on the abutment part 64 of the pressure plate 22, and the biasing force of the spring 48 which works in a direction opposite to the direction of the biasing force of the clutch spring 23 in such a way as to offset the biasing force of the clutch spring 23 acts on the pressure plate 22.

When torque is changed for acceleration in a state where the torque is being transmitted from the primary driven gear 16 to the main shaft 11, the cam-side surfaces of the first convex cams 52 are brought into contact with the cam-side surfaces of the first concave cams 51, respectively. Thereby, the cam mechanism 49 causes a force, which works in a direction away from the disc part 30b of the center cam plate 30, to act on the assist cam plate 50. Thus, the clutch inner 18A to which the assist cam plate 50 is fixed moves in a direction in which the clutch inner 18A is detached from the pressure plate 22. Accordingly, the receiving member 56 abutting on the assist cam plate 50 moves in a direction in which the receiving member 56 weakens the spring force of the spring 48. This weakens the opposite-directional biasing force which acts from the spring 48 in a direction in which the opposite-directional biasing force offsets the biasing force of the clutch spring 23. Consequently, the biasing force of clutch spring 23 is fully exerted, and the pressure-contact force between the driving friction plates 19 and the driven friction plates 20 is accordingly increased.

In addition, when back torque is increased in a condition the back torque is being transmitted, the cam mechanism 58 of the slipper means 25 causes the slipper cam plate 57 fixed to the clutch inner 18A to move in a direction in which the slipper cam plate 57 is detached from the center cam plate 30. This movement of the slipper cam plate 57 brings the abutment part 63 of the clutch inner 18A into intimate contact with the abutment part 64 of the pressure plate 22. The pressure plate 22 accordingly moves in a direction in which the pressure-contact force between the driving friction plates 19 and the driven friction plates 20 is weakened.

Sliding contact surfaces 65, 66 are provided in sliding contact with each other on the clutch inner 18A and the pressure plate 22, respectively. The sliding contact surfaces 65, 66 continue to inner ends of the abutment parts 63, 64 which extend in the radial directions of the clutch inner 18A and the pressure plate 22, respectively, and are each shaped in the form of an arc about the center axis of the clutch inner 18A. To put it specifically, the inner peripheral surface of the annular support wall 18b provided in the clutch inner 18A is made to slidingly contact the insertion cylinder part 22b of the pressure plate 22. The sliding contact surface 66 in sliding contact with the sliding contact surface 65 formed in the inner periphery of the annular support wall 18b is formed in the outer periphery of the front end of the insertion cylinder part 22b.

Furthermore, spaces 67, 68 are formed between the spline projecting parts 39 and the inner periphery of the engagement cylinder part 18a, as well as between the groove-forming projecting parts 37 and the outer periphery of the insertion cylinder part 22b, respectively.

Meanwhile, the guide ring 62 is squeezed between the assist cam plate 50 and the slipper cam plate 57, and is thus fixed to the clutch inner 18A. The inner periphery of this guide ring 62 is put in sliding contact with the outer periphery of the disc part 30*a* in the center cam plate 30. In addition, multiple oil holes 70 which cause the interior and exterior of the engagement cylinder part 18*a* to communicate with each other are provided to the engagement cylinder part 18*a* in the clutch inner 18A. Oil grooves 71 for distributing oil between the guide ring 62 and the assist cam plate 50 as well as between the guide ring 62 and the slipper cam plate 57 are provided in the opposite surfaces of the guide ring 62.

Furthermore, a center hole 72 for guiding oil is coaxially provided in the main shaft 11. Oil passages 73 whose ends communicate with the center hole 72 at positions substantially corresponding to the axial-direction middle portions of the boss part 30*a* in the center cam plate 30 are provided in the sidewall of the main shaft 11. On the other hand, oil supplying passages 74 for supplying oil from the oil passages 73 to the first convex cams 52 of the assist cam plate 50 and the second convex cams 60 of the slipper cam plate 57 are provided in the boss part 30*a* of the center cam plate 30 in such a way as to be directed to a direction oblique to the center axes of the assist cam plate 50 and the slipper cam plate 57. Orifices 75 are provided in these oil supplying passages 74.

Meanwhile, the multiple first concave cams 51 are provided in one of the opposite surfaces of the disc part 30*b* of the center cam plate 30, and the multiple second concave cams 59 are provided in the other of the opposite surfaces thereof. Oil discharging passages 76 for guiding oil to the sliding contact portion between the outer periphery of the center cam plate 30 and the inner periphery of the guide ring 62 are provided in outer peripheral edge portions of the first concave cams 51, respectively. Oil discharging passages 77 (see FIGS. 3A to 3C) for guiding oil to the sliding contact portion between the outer periphery of the center cam plate 30 and the inner periphery of the guide ring 62 are provided in outer peripheral edge portions of the second concave cams 59. Moreover, these oil discharging passages 76, 77 are formed by notching the outer peripheral edge portions of the first and second concave cams 51, 59. In the disc part 30*b* of the center cam plate 30, at least portions where the first and second concave cams 51, 59 are arranged and the notches in the outer peripheral edge portions of the first and second concave cams 51, 59 are formed by forging.

The contact surfaces of the first concave cams 51 and the contact surfaces of the first convex cams 52, which constitute the cam mechanism 49 provided between the center cam plate 30 and the assist cam plate 50, are formed in such a way as to be brought into contact with each other, as well as the contact surfaces of the second concave cams 59 and the contact surfaces of the second convex cams 60, which constitute the cam mechanism 58 provided between the center cam plate 30 and the slipper cam plate 57, are formed in such a way as to be brought into contact with each other, when the assist cam plate 50 and the slipper cam plate 57 rotate relative to the center cam plate 30. The oil discharging passages 76, 77 are provided in the edge portion of the outer periphery of the disc part 30*b* of the center cam plate 30 alone.

Moreover, in a surface of the assist cam plate 50 which is opposed to the disc part 30*b* in the center cam plate 30, the first convex cams 52 are provided, and multiple first concave parts 80, for example, three first concave parts 80 are formed in such a way that two of the first concave parts 80 are arranged at the respective opposite sides of each of the first convex cams 52. In a surface of the slipper cam plate 57 which is opposed to the disc part 30*b* in the center cam plate 30, the second convex cams 60 are provided, and multiple second concave parts 81, for example, three second concave parts 81 are formed in such a way that two of the second concave parts 81 are arranged at the respective opposite sides of each of the second convex cams 60.

Meanwhile, the spring 48, the receiving member 56, the assist cam plate 50, the guide ring 62, the center cam plate 30, the slipper cam plate 57 and the sliding contact plate 61 are designed to be inserted into the engagement cylinder part 18*a* of the clutch inner 18A from the pressure receiving plate 21-side. When assembled, the spring 48, the receiving member 56, the assist cam plate 50, the guide ring 62, the center cam plate 30, the slipper cam plate 57 and the sliding contact plate 61 are beforehand assembled together as an assembled body 84. As shown by the dot and dash line in FIG. 2, an annular step part 85*b* configured to hold the assembled body 84 between the annular step part 85*b* and the pressure receiving plate 21 is provided in a bar-shaped holding tool 85 which penetrates the assembled body 84 in such a way that a front end small-diameter part 85*a* of the holding tool 85 is fitted in the pressure receiving plate 21. Accordingly, the clutch inner 18A is installed with the assembled body 84 being held by the holding tool 85 between the holding tool 85 and the pressure receiving plate 21 in such a way as to cover the assembled body 84.

Next, descriptions will be provided for the operation of Embodiment 1. The clutch inner 18A capable of moving relative to the main shaft 11 in the axial direction, and the pressure plate 22 which is a member different from the clutch inner 18A are connected together detachably in the axial direction and unrotatably relative to each other in such a way that, when the pressure-contact force of the pressure plate 22 is increased by the assist means 24, the pressure plate 22 is moved in the direction in which the driving friction plates 19 and the driven friction plates 20 are brought into pressure contact with each other, and concurrently the clutch inner 18A is moved relative to the pressure plate 22 in the same direction in order for the clutch inner 18A to be detached from the pressure plate 22. For this reason, even if the biasing force by the clutch spring 23 and the withdrawing force from the assist means 24 act on at almost the same timing, these forces do not act directly on the pressure plate 22. Thereby, it is possible to avoid an abrupt clutch connection, and accordingly to achieve an appropriate clutch connection.

In addition, the slipper means 25 is provided between the clutch inner 18A and the main shaft 11 in such a way that, when the torque is changed for deceleration, the clutch inner 18A is brought into intimate contact with the pressure plate 22, and the pressure plate 22 is thus moved in the direction in which the pressure-contact force between the driving friction plates 19 and the driven friction plates 20 is weakened, as well as the pressure-contact force by the pressure plate 22 is thereby decreased. In a case where the slipper means 25 is about to decrease the pressure-contact force by the pressure plate 22 when the torque is changed for deceleration, the back torque can be cut off instantaneously. Thereby, when assisted, it is possible to achieve an appropriate clutch connection, and concurrently to secure the back torque limiter performance equivalent to the conventional one.

In addition, the assist means 24 includes: the spring 48 configured to exert the spring force for biasing the clutch inner 18A against the spring force of the clutch spring 23; and the cam mechanism 49 configured to forcedly move the clutch inner 18A against the biasing force of the spring 48 in the case where the pressure-contact force by the pressure plate 22 is increased when torque is changed for acceleration. For this reason, it is possible to build the structure in which, when assisted, the spring load of the spring 48 opposed to the clutch spring 23 is decreased, and the substantial spring load of the clutch spring 23 is thereby increased, as well as the pressure-contact force is thus increased. Accordingly, the biasing force of the clutch spring 23 can be increased gradually. For this reason, a smooth clutch connection can be attained.

Further, the clutch inner 18A includes the engagement cylinder part 18a whose outer peripheral side is engaged with the driven friction plates 20. The insertion cylinder part 22b coaxially inserted in the engagement cylinder part 18a is provided to the pressure plate 22. The multiple groove-forming projecting parts 37 are provided in the inner periphery of the engagement cylinder part 18a in such a way that the spline grooves 38 are formed in the groove-forming projecting parts 37, respectively. The multiple spline projecting parts 39 engaging with the respective spline grooves 38 are provided in the outer periphery of the insertion cylinder part 22b. For these reasons, the clutch inner 18A and the pressure plate 22 can be spline-engaged with each other while avoiding the clutch inner 18A being built in large size in the axial direction without affecting the engagement portions between the driven friction plates 20 with the outer periphery of the engagement cylinder part 18a.

Furthermore, the flat abutment parts 63, 64 extending along the planes orthogonal to the axes of the clutch inner 18A and the pressure plate 22 are provided in the clutch inner 18A and the pressure plate 22, respectively, in such a way that, when the clutch inner 18A is brought into intimate contact with the pressure plate 22, the abutment parts 63, 64 comes into contact with each other. For this reason, it is possible to decrease the abutment pressure by causing the load to be received by their flat surfaces when the clutch inner 18A and the pressure plate 22 are in contact with each other, and accordingly to secure the rigidities of the abutment parts 63, 64.

The multiple groove-forming projecting parts 37 are provided to the clutch inner 18A in such a way that the spline grooves 38 are formed in the groove-forming projecting parts 37, respectively. The multiple spline projecting parts 39 configured to engage with the respective spline grooves 38 are provided to the pressure plate 22. Because the abutment parts 63, 64 extend inward in the radial direction from the groove-forming projecting parts 37 and the spline projecting parts 39 in such a way as to integrally continue to the groove-forming projecting parts 37 and the spline projecting parts 39, the vicinities of the groove-forming projecting parts 37 and the spline projecting parts 39 can be reinforced by thickening the vicinities thereof.

Moreover, the first oil passage 40 for guiding oil to the engagement portions between the spline grooves 38 and the spline projecting parts 39 is provided in the pressure plate 22 in such a way as to penetrate the insertion cylinder part 22b in the radial direction. For this reason, the slidability of the spline engagement portions can be enhanced by supplying the oil. In addition, the second oil passage 41 for guiding oil to engagement portions between the spline grooves 38 and the spline projecting parts 39 is provided in the pressure plate 22 in such a way as to penetrate the press part 22a of the pressure plate 22 in the axial direction. For this reason, when the oil is supplied to the spline engagement portions by causing the oil to flow in the longitudinal directions of the spline grooves 38 and the spline projecting parts 39, the slidability of the spline engagement portions can be enhanced by supplying the oil.

Further, the sliding contact surfaces 65, 66 which continue to the inner ends of the two abutment parts 63, 64 extending in the radial directions of the clutch inner 18A and the pressure plate 22, and which are each shaped in the form of an arc about the center axis of the clutch inner 18A, are provided to the clutch inner 18A and the pressure plate 22, respectively, in such a way as to come into sliding contact with each other. For this reason, the bringing of these sliding contact surfaces 65, 66 into sliding contact with each other makes it less likely to occur the displacement between the axes of the clutch inner 18A and the pressure plate 22, and accordingly makes it possible to smooth the sliding of the spline engagement portions.

In addition, the spaces 67, 68 are formed between the spline projecting parts 39 and the inner periphery of the engagement cylinder part 18a, as well as between the groove-forming projecting parts 37 and the outer periphery of the insertion cylinder part 22b, respectively. For this reason, not only can the increase in the sliding areas in the respective spline engagement portions be suppressed while the displacement between the axes of the clutch inner 18A and the pressure plate 22 is prevented by the sliding contact between the sliding contact surfaces 65, 66, but also the slidability and lubricity in the spline engagement portions can be enhanced by effectively using the spaces 67, 68 as passages for causing oil to flow.

The assist means 24 includes the center cam plate 30 and the assist cam plate 50 which are opposed to each other in the axial direction. The assist cam plate 50 is inserted in the clutch inner 18A, and is engaged with the clutch inner 18A unrotatably relative to the clutch inner 18A. The stop ring 55 engaging with the assist cam plate 50 in such a way as to block the axial-direction movement of the assist cam plate 50 relative to the clutch inner 18A in the direction in which the assist cam plate 50 is detached from the center cam plate 30, is fitted to the inner periphery of the engagement cylinder part 18a in the clutch inner 18A. For these reason, the fixing of the assist cam plate 50 to the clutch inner 18A by use of the stop ring 55 makes it possible to reduce the number of parts, the weight and the costs compared to the conventional fixing structure using bolts. In addition, this fixing enables the assist cam plate 50 to be fixed to the clutch inner 18A in such a way that no lopsided attachment to the clutch inner 18A occurs in the circumferential direction.

The spring 48 included in the assist means 24 biases the clutch inner 18A in the axial direction with the assist cam plate 50 being interposed in between. The annular receiving member 56 for receiving the end portion of the spring 48 which is on the closer side to the clutch inner 18A is contiguously arranged on the inner periphery of the stop ring 55. For these reasons, the use of the receiving member 56 makes it possible to prevent the stop ring 55 from coming off, and can contribute to the reduction in the number of parts by eliminating specialized parts for preventing the stop ring from coming off.

Furthermore, the annular depressed part 54 to which to attach the stop ring 55 is provided in the inner periphery of the engagement cylinder part 18a in the clutch inner 18A, and the receiving part 56 is formed with the outer diameter equal to the inner diameter of the stop ring 55 as attached to the annular depressed part 54. For these reasons, the receiving member 56 is fitted to the stop ring 55, and it is accordingly possible to prevent the stop ring 55 from coming off.

In addition, the axial-direction length L1 of the receiving member 56 is set larger than the axial-direction opening width L2 of the annular depressed part 54. For this reason, the stop ring 55 can be protected by the receiving member 56 in such a way that the annular depressed part 54 to which to attach the stop ring 55 is covered with the receiving member 56.

Furthermore, the multi-plate clutch system 14A includes both the assist means 24 and the slipper means 25. The assist cam plate 50 and the slipper cam plate 57 respectively opposed to the opposite sides of the disc part 30b of the center cam plate 30 fixed to the main shaft 11 and being common between the assist means 24 and the slipper means 25 is fixed to the clutch inner 18A in such a way as to be squeezed between the annular support wall 18b provided to the clutch inner 18A and the stop ring 55. For this reason, the assist cam plate 50 and the slipper cam plate 57 can be fixed to the clutch inner 18A by use of the single stop ring 55, and it is accordingly possible to reduce the number of parts.

The annular guide ring 62 is interposed between the assist cam plate 50 and the slipper cam plate 57. This guide ring 62 is arranged between the outer periphery of the center cam plate 30 and the inner periphery of the clutch inner 18A. For these reasons, when the annular guide ring 62 causing the center cam plate 30 to hold the clutch inner 18A is interposed between the assist cam plate 50 and the slipper cam plate 57, it is possible to suppress the increase in the number of parts needed to the structure in which the assist cam plate 50 and the slipper cam plate 57 are fixed to the clutch inner 18A by use of the single stop ring 55.

In addition, the outer peripheries of the assist cam plate 50 and the slipper cam plate 57 are spline-engaged with the inner periphery of the engagement cylinder part 18a in the clutch inner 18A. The width W1 of the spline-engagement of the slipper cam plate 57 with the clutch inner 18A is set smaller than the width W2 of the spline-engagement of the assist cam plate 50 with the clutch inner 18A. Here, the slipper cam plate 57 is arranged on the closer side to the annular support wall 18b out of the assist cam plate 50 and the slipper cam plate 57. For these reasons, when the width W2 of the spline-engagement of the assist cam plate 50 biased by the spring 48 with the clutch inner 18A is made larger, it is possible to prevent the axial displacement of the assist cam plate 50, which would otherwise be likely to occur due to the biasing by the spring 48.

Moreover, the inner peripheral surface of the annular support wall 18b provided in the clutch inner 18A is brought into sliding contact with the pressure plate 22. For this reason, when the clutch inner 18A is supported by the pressure plate 22, it is possible to prevent the occurrence of the axial displacement between the clutch inner 18A and the pressure plate 22.

Meanwhile, the assist means 24 includes the center cam plate 30 and the assist cam plate 50 which are opposed to each other in the axial direction. The slipper means 25 includes: the center cam plate 30 which is common between the slipper means 25 and the assist means 24; and the slipper cam plate 57 opposed to the center cam plate 30 in the axial direction. The guide ring 62 whose inner peripheral surface is put in sliding contact with the outer peripheral surface of the center cam plate 30 as one of the cam plates forming the pairs 30, 50; 30, 57 is fixed to the engagement cylinder part 18a of the clutch inner 18A. In addition, the oil discharging passages 76, 77 for guiding oil to the sliding contact portion between the center cam plate 30 and the guide ring 62 are provided in the outer peripheral edge portions of the first and second concave cams 51, 59 provided to the opposite sides of the disc part 30b in the center cam plate 30, respectively.

This leads to the centering of the guide ring 62 fixed to the clutch inner 18A, in other words, the clutch inner 18A and the center cam plate 30. Such a centering structure makes it possible to sufficiently supply oil accumulated in the first and second concave cams 51, 59 provided in the center cam plate 30 to the sliding contact portion between the guide ring 62 and the center cam plate 30, and accordingly to enhance the lubricity thereof.

Moreover, the oil discharging passages 76, 77 are formed by notching the outer peripheral edge portions of the first and second concave cams 51, 59, respectively. For this reason, the oil discharging passages 76, 77 can be formed with the simple structure, and the lubricity in the sliding contact portions thereof can be enhanced with the simple structure.

Further, at least the portions of the center cam plate 30 in which the first and second concave cams 51, 59 are arranged are formed by forging. For this reason, the depth of the depressions thereof can be made shallower by providing the notches in the outer peripheral edge portions of the first and second concave cams 51, 59, respectively. Thereby, it is possible to suppress the amount of deformation of the parts which occurs during forming of the parts, and accordingly to enhance the precision by suppressing the occurrence of parts defectively formed.

Meanwhile, the contact surfaces of the first concave cams 51 and the contact surfaces of the first convex cams 52, which constitute the cam mechanism 49 provided between the center cam plate 30 and the assist cam plate 50, are formed in such a way as to be brought into contact with each other, as well as the contact surfaces of the second concave cams 59 and the contact surfaces of the second convex cams 60, which constitute the cam mechanism 58 provided between the center cam plate 30 and the slipper cam plate 57, are formed in such a way as to be brought into contact with each other, when the assist cam plate 50 and the slipper cam plate 57 rotate relative to the center cam plate 30. The oil discharging passages 76, 77 are provided in the edge portion of the outer periphery of the disc part 30b of the center cam plate 30 alone. For this reason, the providing of no oil discharging passage to the contact surfaces between the first and second concave cams 51, 59 and the first and second convex cams 52, 60 makes it possible to avoid the decrease in their cam contact strength, and to secure the lubricity in the sliding contact portions.

In addition, the first concave parts 80, two of which are respectively arranged at the opposite sides of each of the first convex cams 52, are formed in the assist cam plate 50. The second concave parts 81, two of which are respectively arranged at the opposite sides of each of the second convex cams 60, are formed in the slipper cam plate 57. For these reasons, oil supplied to the first and second convex cams 52, 60 is caught by and retained in the first and second concave parts 80, 81, two of which are arranged at the opposite sides of each of the first and second convex cams 52, 60. Thus, oil to be distributed to the first and second convex cams 52, 60 is secured. Thereby, it is possible to enhance the lubricity between the first concave cams 51 and the first convex cams 52, as well as between the second concave cams 59 and the second convex cams 60.

Furthermore, the outer peripheral edge portions of the first and second concave parts 80, 81 are formed curving toward the sliding contact portion between the center cam plate 30 and the guide ring 62. For this reason, it is possible to enhance the lubricity while actively supplying oil accumulated in the first and second concave cams 51, 59 to the sliding contact portion.

Moreover, the oil supplying passages 74 for supplying oil to the first convex cams 52 of the assist cam plate 50 and the second convex cams 60 of the slipper cam plate 57 are provided in the boss part 30a of the center cam plate 30 in such a way as to be directed to a direction oblique to the center axes of the assist cam plate 50 and the slipper cam plate 57. For this reason, by ejecting oil to interstices between the first concave cams 51 and the first convex cams 52, as well as between the second concave cams 59 and the second convex cams 60, which need the lubricity in particular, it is possible to prevent insufficient lubricity which would otherwise occur due to oil shortage.

Further, the orifices 75 are provided in the oil supplying passages 74. For this reason, when oil is ejected toward the first and second convex cams 52, 60 with a high pressure and the oil is thus convert to mist and dispersed, it is possible to enhance the overall lubricity between the first concave cams 51 and the first convex cams 52, as well as between the second concave cams 59 and the second convex cams 60.

[Embodiment 2]

Figure 6:
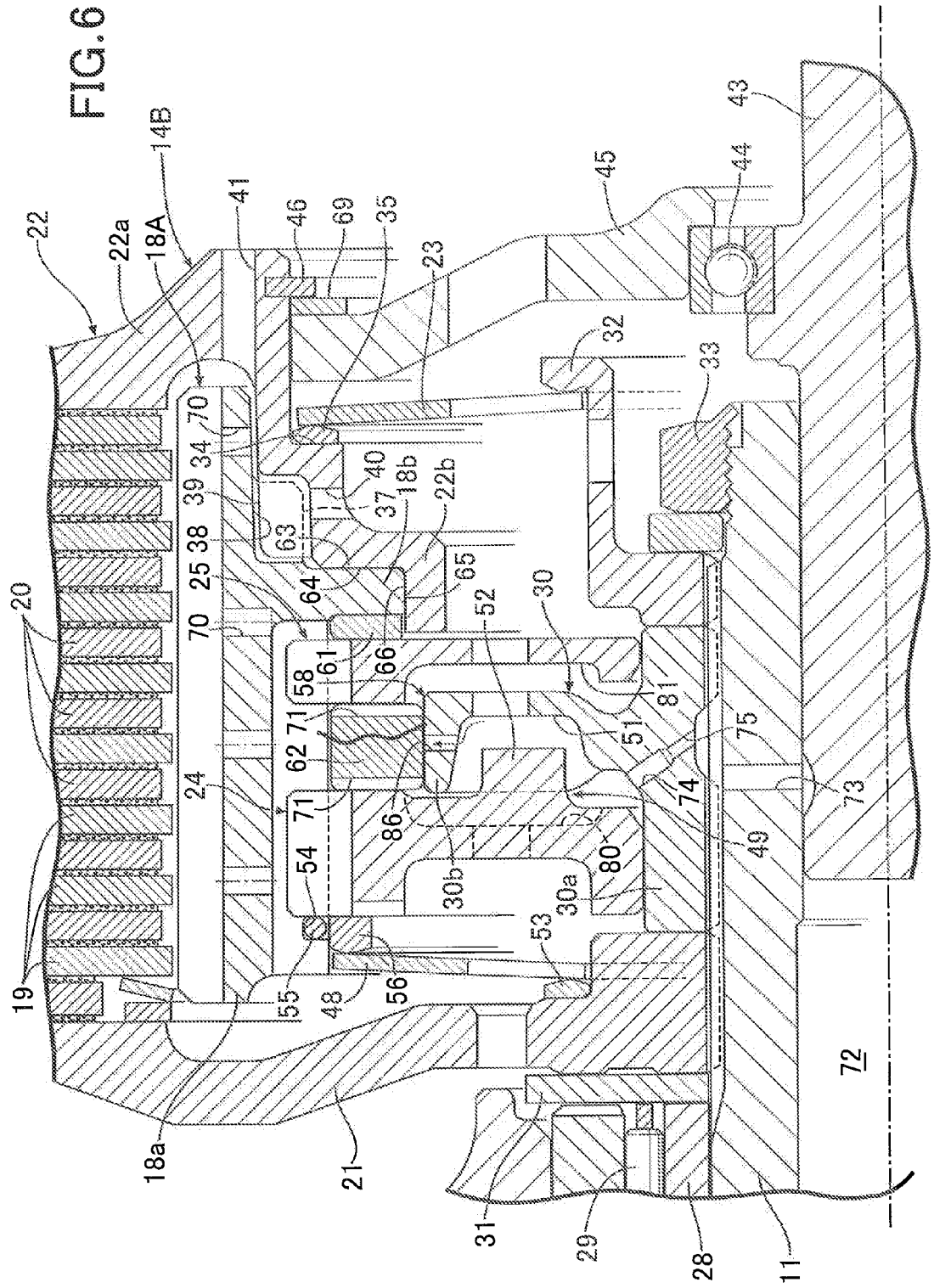
FIG. 6 is a cross-sectional view of a multi-plate clutch system according to Embodiment 2, which corresponds to FIG. 2.

Referring to FIG. 6, descriptions will be provided for Embodiment 2 of the present invention. Parts corresponding to those of Embodiment 1 will be only illustrated with the same or similar reference numerals, and detailed descriptions for such parts will be omitted.

As through-holes through which the inner surfaces and outer surfaces of the first concave cams 51 communicate with each other, oil discharging passages 86 for discharging oil to the sliding contact portion between the inner periphery of the guide ring 62 and the outer periphery of the disc part 30b in the center cam plate 30 are formed in the outer peripheral edge portions of the first concave cams 51 provided in one surface of the disc part 30b of the center cam plate 30 common between the assist means 24 and the slipper means 25 included in this multi-plate clutch system 14B. In addition, similar oil discharging passages (not illustrated) are provided in the outer peripheral edge portions of the second concave cams 59 (refer to Embodiment 1) provided in the other surface of the disc part 30b.

According to Embodiment 2, the oil discharging passages 86 are formed by providing the through-holes through which the inner surfaces and outer surfaces of the outer peripheral edge portions of the first and second concave cams 51, 59 communicate with each other. For this reason, regardless of the height of the peripheral edge portions of the first and second concave cams 51, 59, oil in the first and second concave cams 51, 59 can be securely supplied to the sliding contact portion between the inner periphery of the guide ring 62 and the outer periphery of the disc part 30b in the center cam plate 30.

[Embodiment 3]

Figure 7:
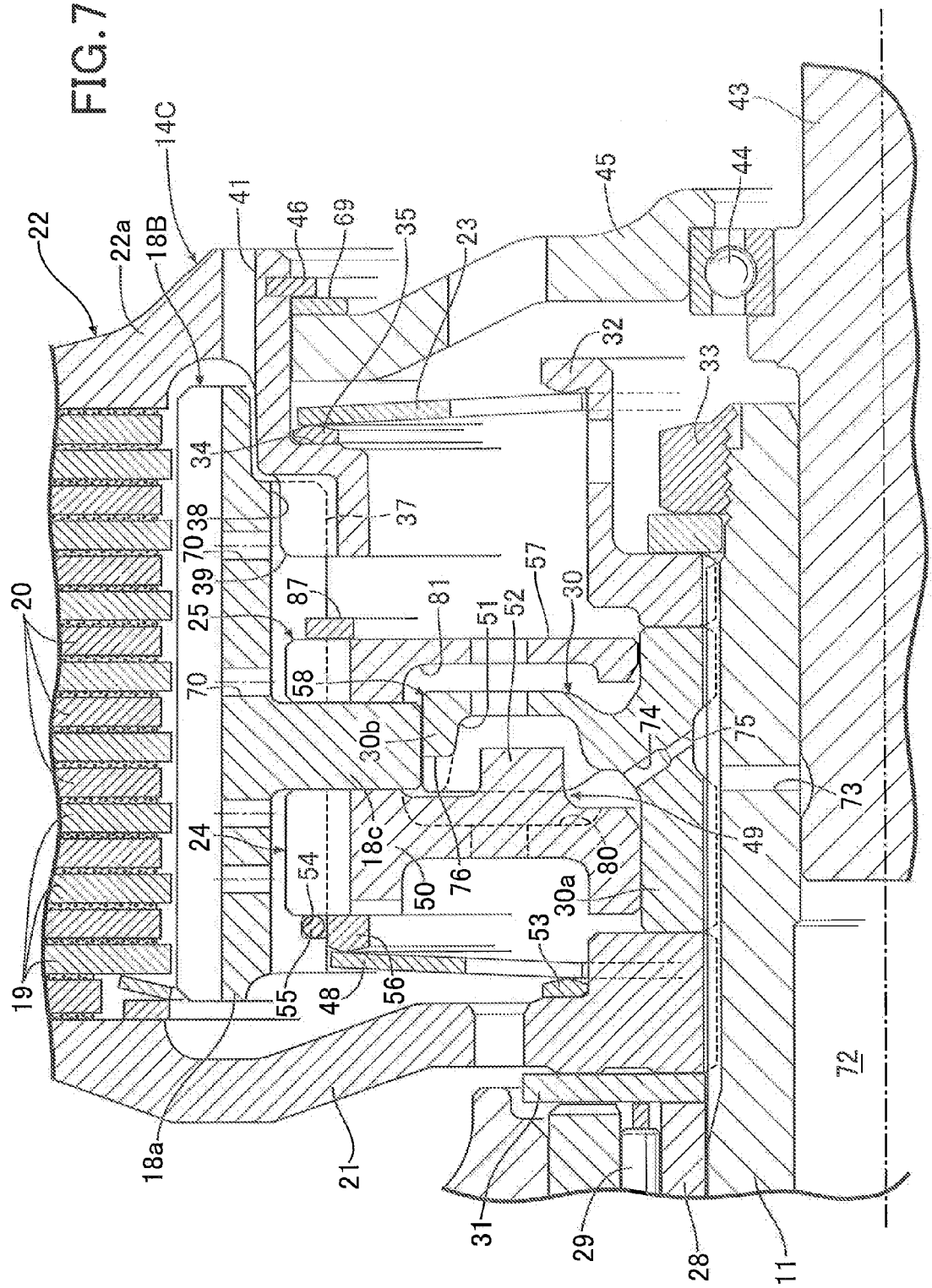
FIG. 7 is a cross-sectional view of a multi-plate clutch system according to Embodiment 3, which corresponds to FIG. 2.

Referring to FIG. 7, descriptions will be provided for Embodiment 3 of the present invention. Parts corresponding to those of Embodiments 1 and 2 will be only illustrated with the same or similar reference numerals, and detailed descriptions for such parts will be omitted.

A clutch inner 18B included in this multi-plate clutch system 14C integrally includes: an engagement cylinder part 18a whose outer periphery is engaged with the driven friction plates 20; and an annular intermediate wall 18c projecting inward in the radial direction from the inner surface of a middle portion of the engagement cylinder part 18a. The inner periphery of the annular intermediate wall 18c is put in sliding contact with the outer periphery of the center cam plate 30 common between the assist means 24 and the slipper means 25.

In addition, stop rings 55, 87 engaging with both the assist cam plate 50 and the slipper cam plate 57, between which the annular intermediate wall 18c of the clutch inner 18B is interposed, from the sides opposite from the annular intermediate wall 18c are attached to the assist cam plate 50 and the slipper cam plate 57, respectively. Out of both stop rings 55, 87, the stop ring 55 whose inner periphery is arranged contiguous to the receiving member 56 for receiving the spring 48 is formed of a round lateral cross-sectional shape, whereas the other stop ring 87 is formed of a square lateral cross-sectional shape.

Moreover, as in Embodiment 1, the first and second concave cams 51, 59 are respectively provided in the opposite surfaces of the disc part 30b in the center cam plate 30. As in Embodiment 1, the oil discharging passages 76, 77 for guiding oil to the sliding contact portion between the center cam plate 30 and the clutch inner 18B are provided in the outer peripheral edge portions of the concave cams 51, 59.

According to Embodiment 3, from the two sides, the annular intermediate wall 18c provided to the clutch inner 18B is interposed between the assist cam plate 50 and the slipper cam plate 57, which are opposed to the center cam plate 30 from the two sides, respectively. The stop rings 55, 87 engaging with the assist cam plate 50 and the slipper cam plate 57 from the opposite sides from the annular intermediate wall 18c are attached to the clutch inner 18B, respectively. The stop ring 55 whose inner periphery is arranged contiguous to the receiving member 56 is formed of the round lateral cross-sectional shape, because the deformation of the stop ring 55 is suppressed resulting from the stop ring 55 being held by the receiving member 56. The rigidity of the other stop ring 87 is enhanced by forming the stop ring 87 with the square lateral cross-sectional shape for the purpose of preventing the stop ring 87 from coming off due to its deformation. Thus, it is possible to realize the structure for fixing the assist cam plate 50 and the slipper cam plate 57 in small size by use of the stop rings 55, 87, and with lower costs.

Moreover, the outer periphery of the center cam plate 30 is put in sliding contact with the inner periphery of the annular intermediate wall 18c of the clutch inner 18B. For this reason, the axial displacement between the clutch inner 18B and the center cam plate 30 can be prevented.

Further, the centering structure for causing the center cam plate 30 to be in sliding contact with and hold the inner peripheral surface of the clutch inner 18B makes it possible to sufficiently supply oil accumulated in the first and second concave cams 51, 59 to the sliding contact portion between the center cam plate 30 and the clutch inner 18B in such a way that the oil is guided to the sliding contact portion between the center cam plate 30 and the clutch inner 18B from the oil discharging passages 76, 77 provided in the outer peripheral edge portions of the first and second concave cams 51, 59 which are provided on the opposite surfaces of the disc part 30b in the center cam plate 30. Accordingly, the enhancement of the lubricity can be achieved.

Embodiments of the present invention are explained above, but the present invention is not limited to the above-mentioned embodiments and may be modified in a variety of ways as long as the modifications do not depart from the gist of the present invention.

What is claimed is:

1. A multi-plate clutch system comprising:
a clutch outer connected to an input member;
a clutch inner connected to an output member;
a plurality of driving friction plates engaged with the clutch outer movably in an axial direction, and unrotatably relative to the clutch outer;
a plurality of driven friction plates alternately overlapped with the driving friction plates, and engaged with the clutch inner movably in the axial direction, and unrotatably relative to the clutch inner;
a pressure plate movable in the axial direction to bring the driving friction plates and the driven friction plates into pressure contact with each other, thereby frictionally engaging the driving friction plates and the driven friction plates together;

a clutch spring for biasing the pressure plate in a direction in which the driving friction plates and the driven friction plates are brought into pressure contact with each other; and at least one of assist means and slipper means, the assist means configured to increase a pressure contact force produced by the pressure plate when torque is changed for acceleration, the slipper means configured to decrease the pressure contact force produced by the pressure plate when the torque is changed for deceleration, wherein said at least one of the assist means and the slipper means includes paired cam plates which are opposed to each other in the axial direction, a ring member whose inner peripheral surface is put in sliding contact with an outer peripheral surface of a first cam plate out of the paired cam plates is fixed to the clutch inner, and an oil discharging passage for guiding oil to a sliding contact portion between the first cam plate and the ring member is provided in an outer peripheral edge portion of a concave cam formed in the first cam plate.

2. The multi-plate clutch system according to claim 1, wherein
the oil discharging passage is formed by notching the outer peripheral edge portion of the concave cam.

3. The multi-plate clutch system according to claim 2, wherein
at least a portion of the first cam plate in which the concave cam is arranged is formed by forging.

4. The multi-plate clutch system according to claim 2, wherein
a contact surface of the concave cam and a contact surface of a convex cam, which are provided in the paired cam plates to come into contact with each other, are formed to come into contact with each other when the paired cam plates rotate relative to each other, and
the oil discharging passage is provided in the outer peripheral edge portion of only the first cam plate.

5. The multi-plate clutch system according to claim 2, wherein
the concave cam and a convex cam are provided in the paired cam plates to come into contact with each other, and
concave parts, which are respectively arranged at opposite sides of the convex cam, are formed in one cam plate, which is provided with the convex cam, out of the paired cam plates.

6. The multi-plate clutch system according to claim 1, wherein
the oil discharging passage is formed as a through-hole which passes through the outer peripheral edge portion of the concave cam from an inner surface thereof to an outer surface thereof.

7. The multi-plate clutch system according to claim 1 according to claim 1, wherein
a contact surface of the concave cam and a contact surface of a convex cam, which are provided in the paired cam plates to come into contact with each other, are formed to come into contact with each other when the paired cam plates rotate relative to each other, and
the oil discharging passage is provided in the outer peripheral edge portion of only the first cam plate.

8. The multi-plate clutch system according to claim 1, wherein
the concave cam and a convex cam are provided in the paired cam plates to come into contact with each other, and
concave parts, which are respectively arranged at opposite sides of the convex cam, are formed in one cam plate, which is provided with the convex cam, out of the paired cam plates.

9. The multi-plate clutch system according to claim 8, wherein
outer peripheral edge portions of the respective concave parts are formed curving toward a sliding contact portion in an outer periphery of the first cam plate.

10. The multi-plate clutch system according to claim 1, wherein
the first cam plate of the paired cam plates opposed to each other integrally includes: a boss part supported by the output member; and a disc part provided with the concave cam corresponding to a convex cam provided in a second cam plate of the paired cam plates, and jutting from the boss part outward in a radial direction, and
an oil supplying passage for supplying oil toward the convex cam in the second cam plate is provided in the boss part in such a way as to be directed to a direction oblique to center axes of the two respective cam plates.

11. The multi-plate clutch system according to claim 10, wherein
an orifice is provided in the oil supplying passage.

12. The multi-plate clutch system according to claim 1, wherein the clutch spring has an outer diameter larger than an outer diameter of the ring member.

13. The multi-plate clutch system according to claim 1, wherein the assist means includes a spring having an outer diameter substantially the same as an outer diameter of the ring member.

14. A multi-plate clutch system comprising:
a clutch outer connected to an input member;
a clutch inner connected to an output member;
a plurality of driving friction plates engaged with the clutch outer movably in an axial direction, and unrotatably relative to the clutch outer;
a plurality of driven friction plates alternately overlapped with the driving friction plates, and engaged with the clutch inner movably in the axial direction, and unrotatably relative to the clutch inner;
a pressure plate movable in the axial direction in order to bring the driving friction plates and the driven friction plates into pressure contact with each other, thereby frictionally engaging the driving friction plates and the driven friction plates together;
a clutch spring for biasing the pressure plate in a direction in which the driving friction plates and the driven friction plates are brought into pressure contact with each other; and
at least one of assist means and slipper means, the assist means configured to increase a pressure contact force produced by the pressure plate when torque is changed for acceleration, the slipper means configured to decrease the pressure contact force produced by the pressure plate when the torque is changed for deceleration, wherein
said at least one of the assist means and the slipper means includes paired cam plates which are opposed to each other in the axial direction, an inner peripheral surface of the clutch inner is supported in sliding contact with an outer peripheral surface of a first cam plate out of the paired cam plates, and an oil discharging passage for guiding oil to a sliding contact portion between the first cam plate and the clutch inner is provided in an outer peripheral edge portion of a concave cam formed in the first cam plate, and a stop ring is fitted into an annular depressed part which is provided on an inner periphery of an engagement cylinder part of the clutch inner.

15. The multi-plate clutch system according to claim 14, wherein
the oil discharging passage is formed by notching the outer peripheral edge portion of the concave cam.

16. The multi-plate clutch system according to claim 14, wherein
the oil discharging passage is formed as a through-hole which passes through the outer peripheral edge portion of the concave cam from an inner surface thereof to an outer surface thereof.

17. The multi-plate clutch system according to claim 14, wherein
a contact surface of the concave cam and a contact surface of a convex cam, which are provided in the paired cam plates to come into contact with each other, are formed to come into contact with each other when the paired cam plates rotate relative to each other, and
the oil discharging passage is provided in the outer peripheral edge portion of only the first cam plate.

18. The multi-plate clutch system according claim 14, wherein the clutch spring has an outer diameter larger than a diameter of an inner peripheral surface of an annular intermediate wall projecting inwardly in the radial direction from an inner surface of the clutch inner.

19. The multi-plate clutch system according to claim 14, wherein
the concave cam and a convex cam are provided in the paired cam plates to come into contact with each other, and
concave parts, which are respectively arranged at opposite sides of the convex cam, are formed in one cam plate, which is provided with the convex cam, out of the paired cam plates.

20. The multi-plate clutch system according to claim 14, wherein the assist means includes a spring having an inner diameter that is larger than a diameter of an inner peripheral surface of an annular intermediate wall projecting inwardly in a radial direction from an inner surface of the clutch inner.

* * * * *